United States Patent [19]

Barry

[11] Patent Number: 5,733,092
[45] Date of Patent: Mar. 31, 1998

[54] ROTARY LOADER AND SYSTEM

[76] Inventor: Leonard D. Barry, 19300 Pennington, Detroit, Mich. 48221

[21] Appl. No.: 436,722

[22] Filed: May 8, 1995

[51] Int. Cl.$^6$ ................................................ B65G 67/02
[52] U.S. Cl. ........................ 414/337; 414/392; 414/917; 414/399; 414/744.3; 414/344; 414/341; 212/319
[58] Field of Search ............................. 212/319; 414/373, 414/389, 390, 391, 392, 399, 572, 744.2, 744.3, 339, 334, 340, 341, 342, 664, 665, 343, 344, 337, 666, 352, 917

[56] References Cited

U.S. PATENT DOCUMENTS

| | | | |
|---|---|---|---|
| 2,644,593 | 7/1953 | Miller | 212/319 X |
| 3,169,648 | 2/1965 | Tantlinger | 414/399 |
| 4,370,086 | 1/1983 | Barry | 414/337 |
| 4,746,257 | 5/1988 | Barry | 414/392 |
| 4,883,185 | 11/1989 | Fujitani et al. | 212/319 X |
| 5,219,261 | 6/1993 | Barry | 414/392 |

FOREIGN PATENT DOCUMENTS 176796  2/1989  Japan ..................... 212/319

*Primary Examiner*—Frank E. Werner
*Attorney, Agent, or Firm*—Gifford, Krass, Groh, Sprinkle, Patmore, Anderson & Citkowski, P.C.

[57] ABSTRACT

This is a top-lifting rotary loader and system for cargo containers and is especially suited for loading and unloading double-stacking container well cars and single level railway cars, semitrailers, etc. This loader has a vertical pivot post about which turns a parallelogram linkage connecting a mast vertically supported on one or more wheels to revolve about the post and a second parallelogram linkage extending from the mast out to support a depending parallelepiped linkage frame pivotally supporting a loadspreader having depending aligning columns adjustable to align transversely both a railway and a highway vehicle, and cylinder or cam track means for lifting or lowering the the second parallelogram linkage arms to transfer a load. The loader can be automated to various degrees with cam tracks. The loader can be operator controlled, the cam track can set the height for its loadspreader to clear the container over the vehicle and the operator control the dip for transfer or the cam track can have dips to lower and lift the container. Cam tracks can operate the loaders for one or more levels of transfer. The masts run up and down inclines as the cam wheel runs down and up oppositely on slopes in the cam track to lift and lower the crane to balance out the lift slopes and reduce the size of the dip in the cam track. The cars are moved by car movers to the rotary loader for transfer. The car's well and top level are loaded or unloaded by loaders on opposite sides of track preferably a car length apart for quick loading. The vertical pivot column can be mounted on top of a traveling gantry so the mast can run around the gantry when the gantry is stopped and the drive for the mast be used to move the gantry.

16 Claims, 10 Drawing Sheets

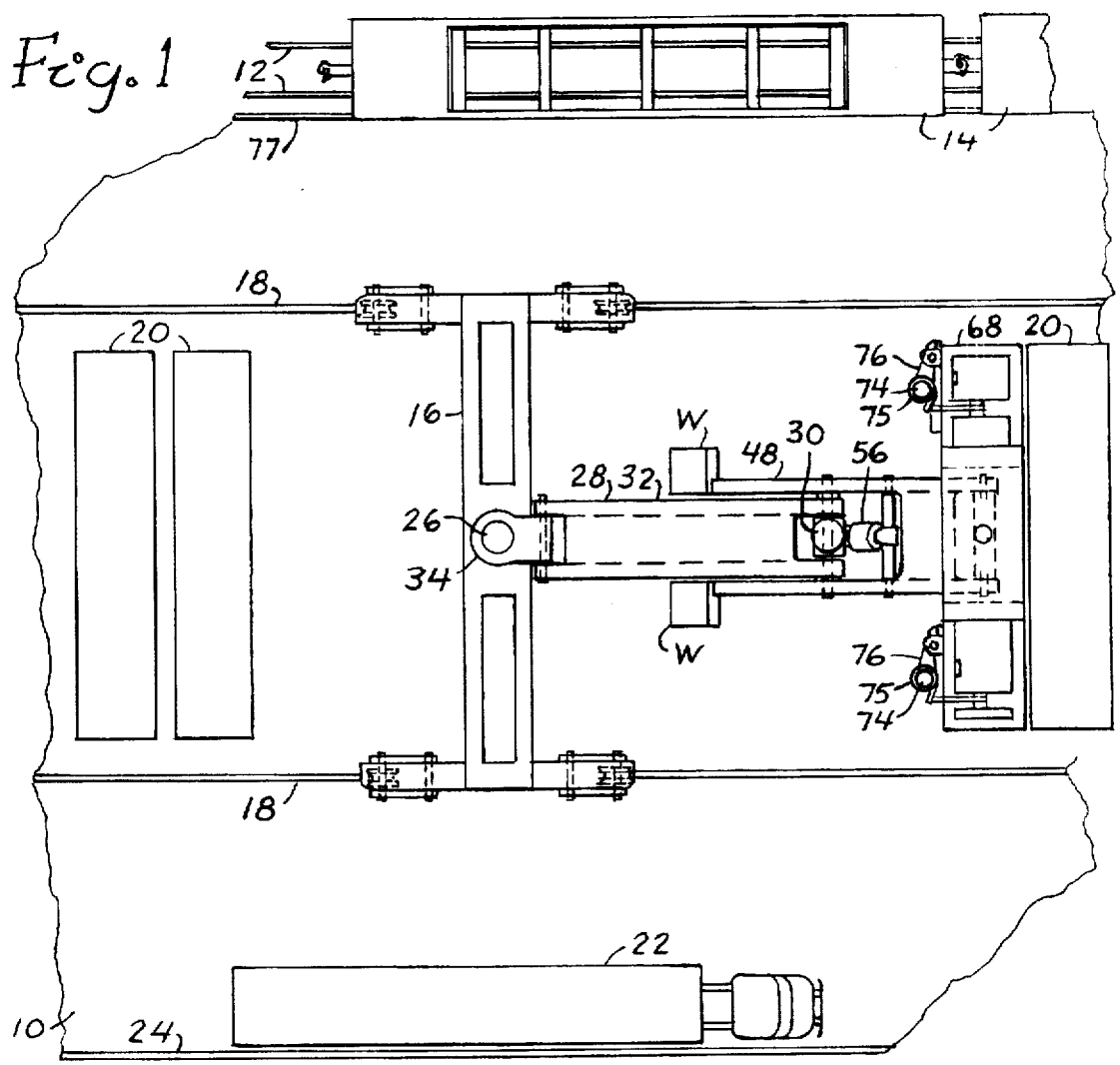
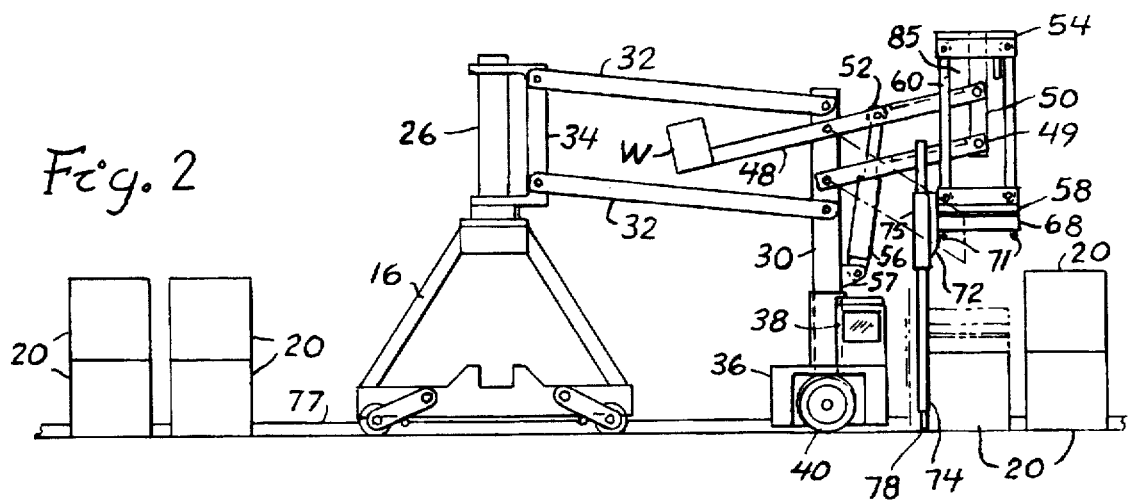

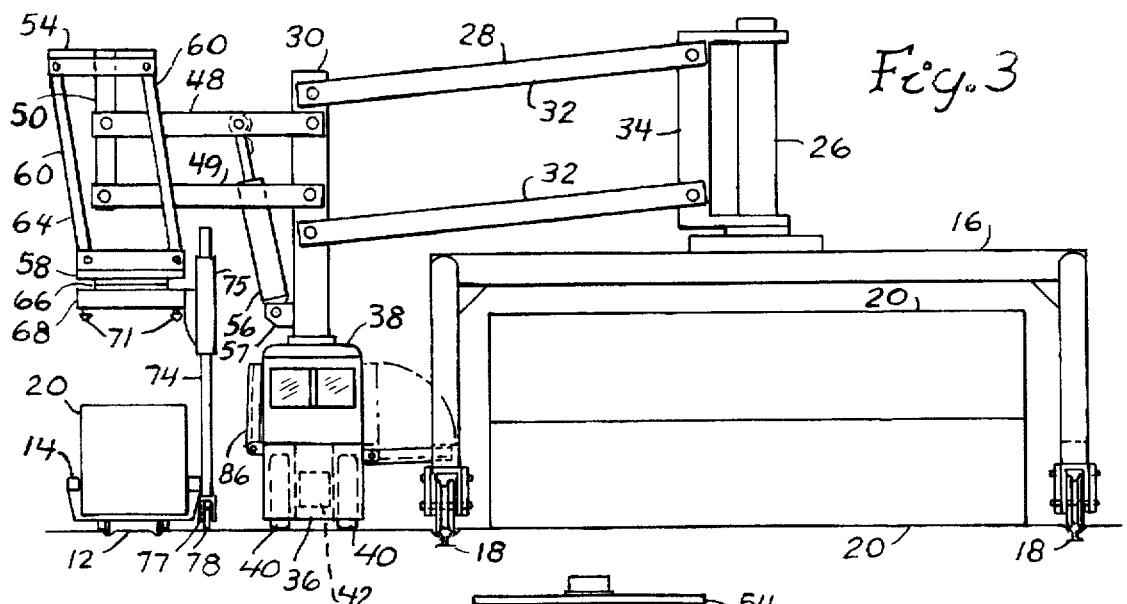
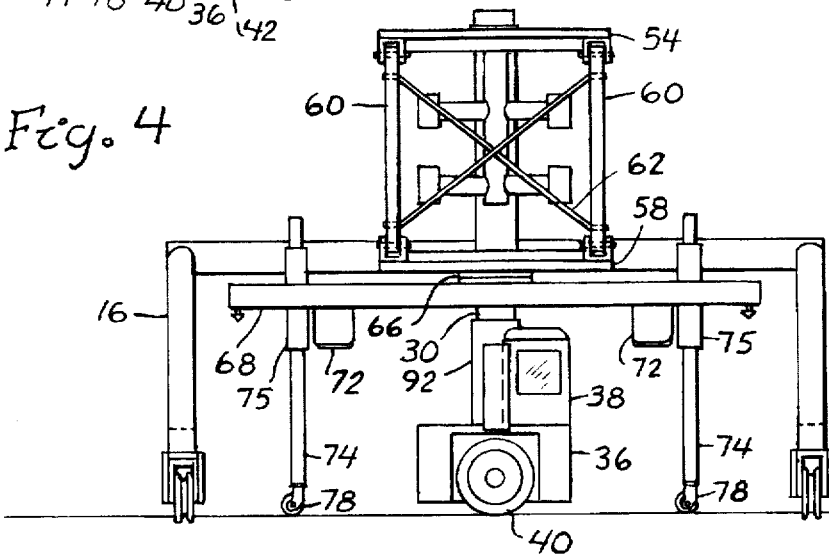
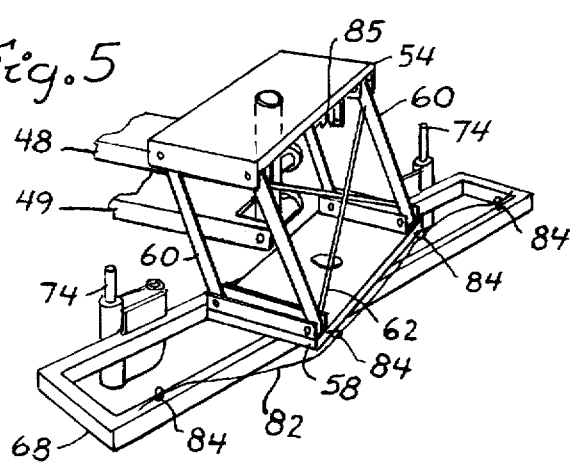
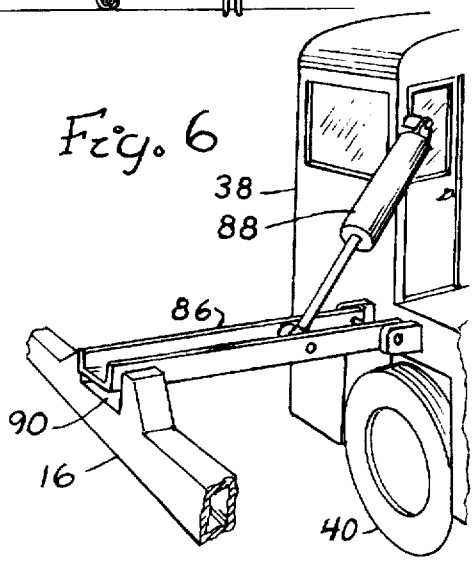

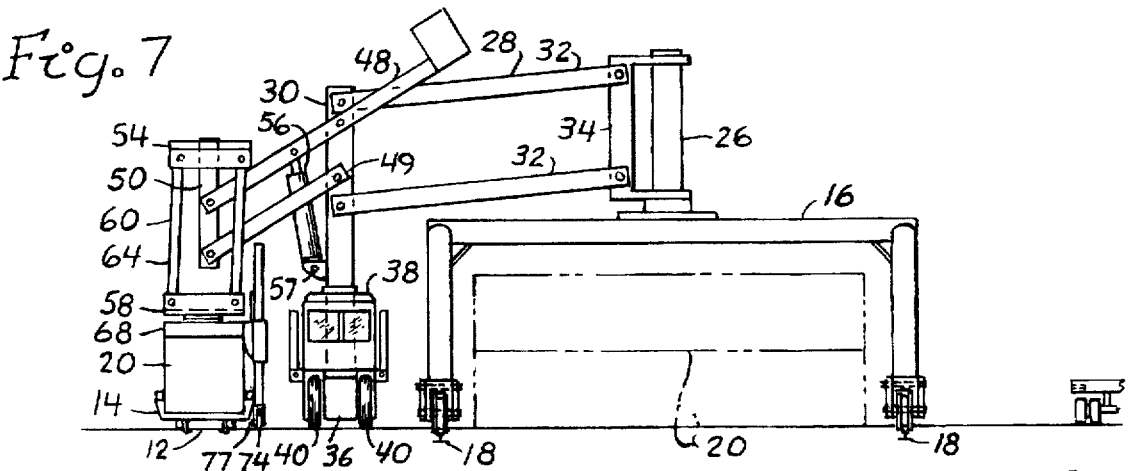
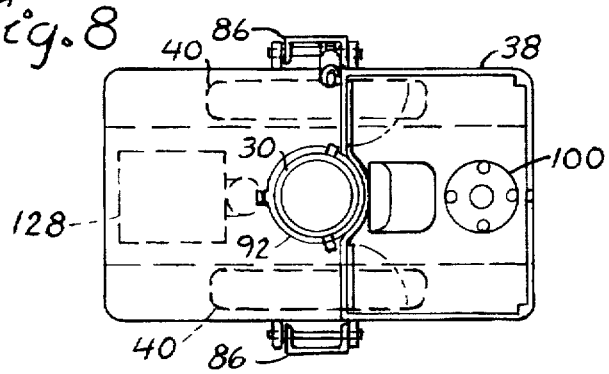
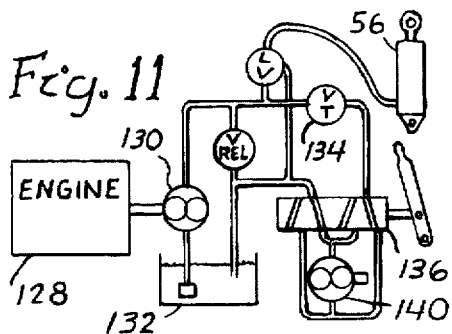
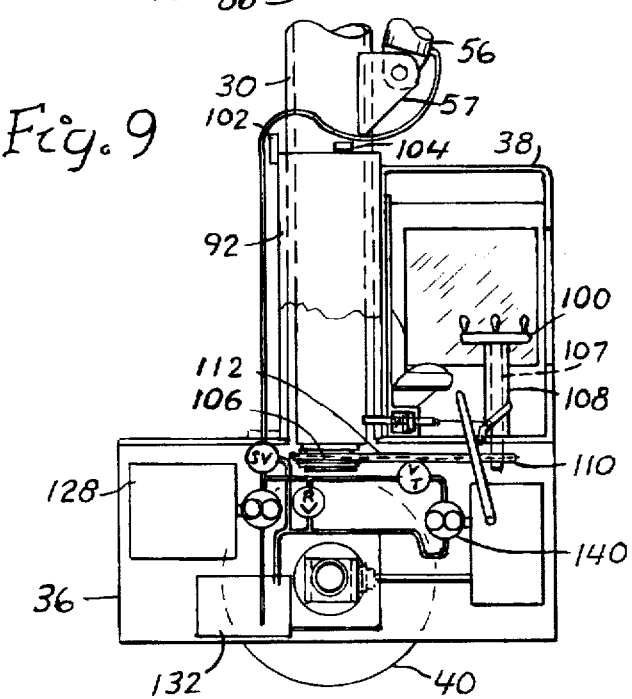
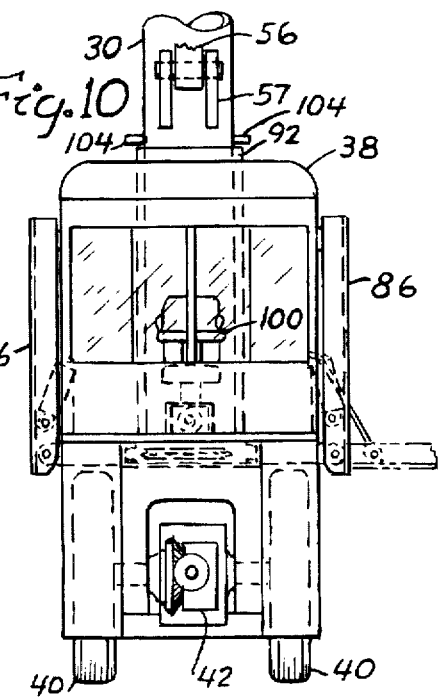

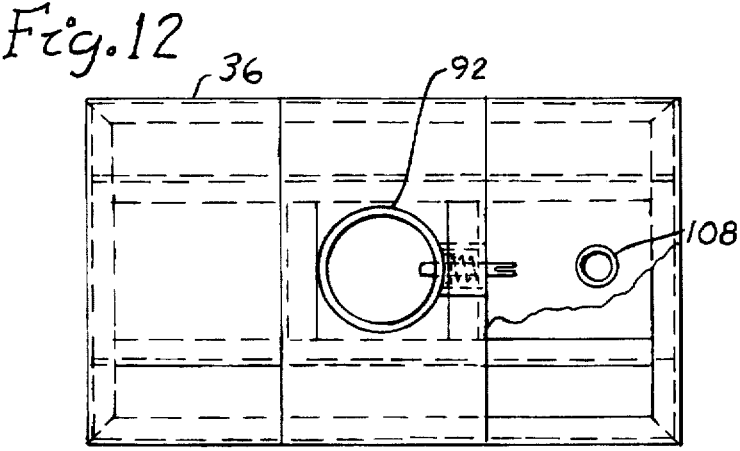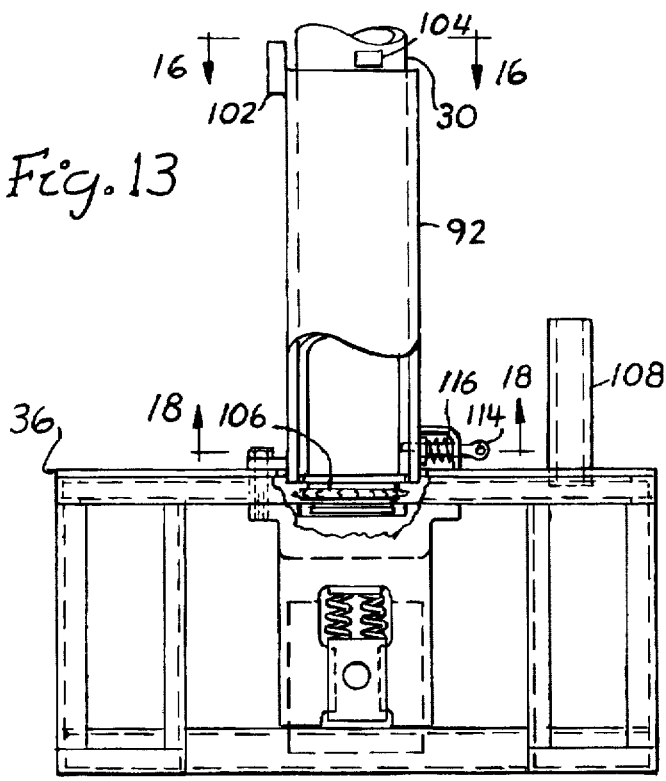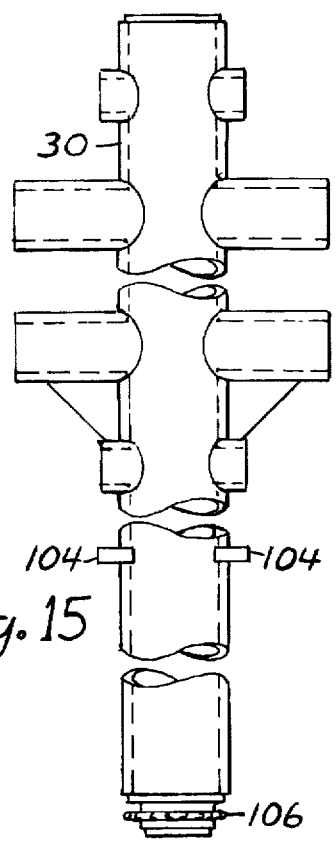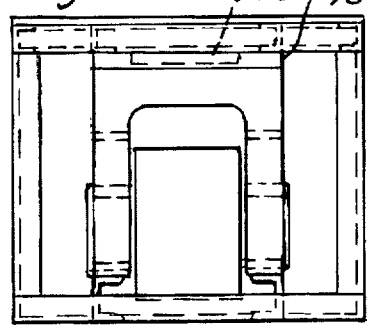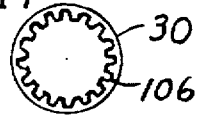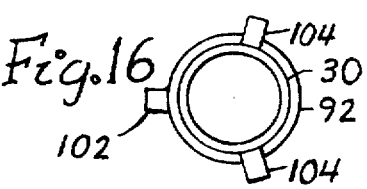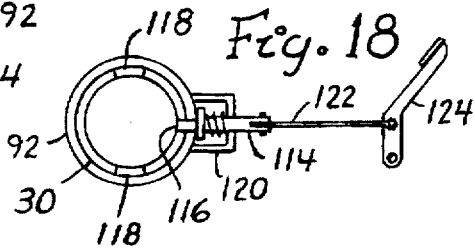

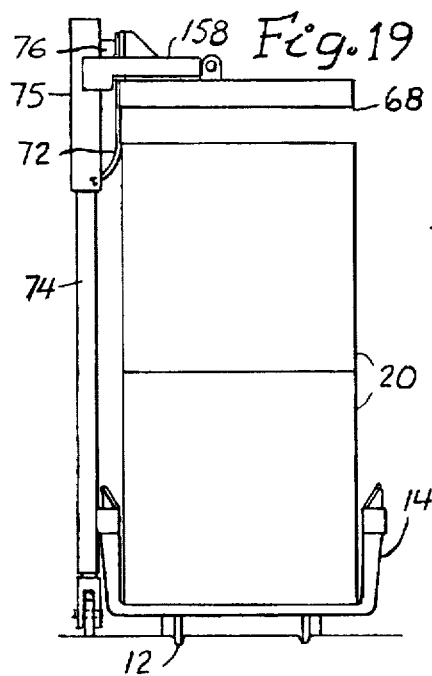
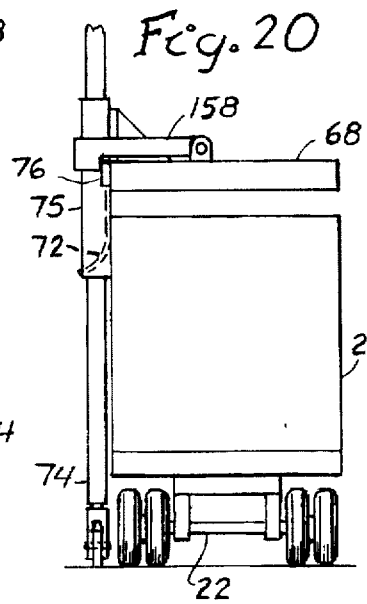
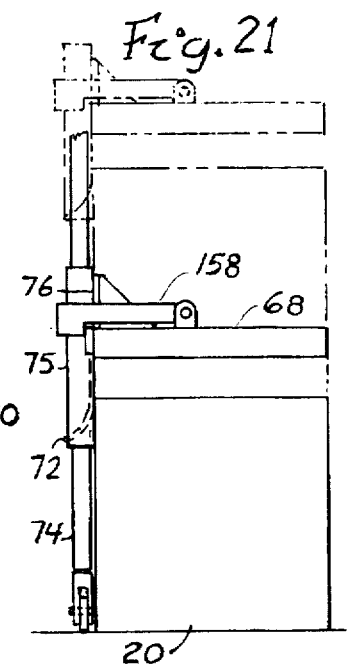
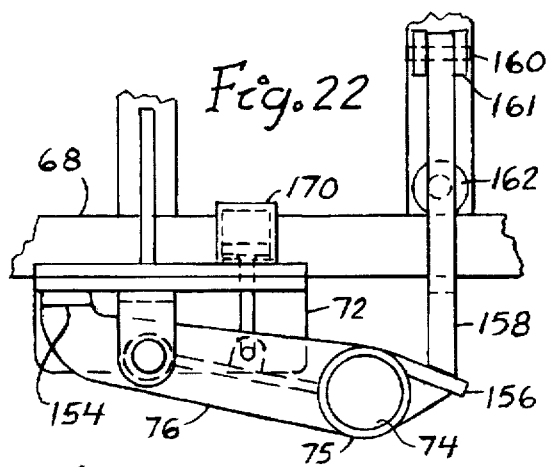
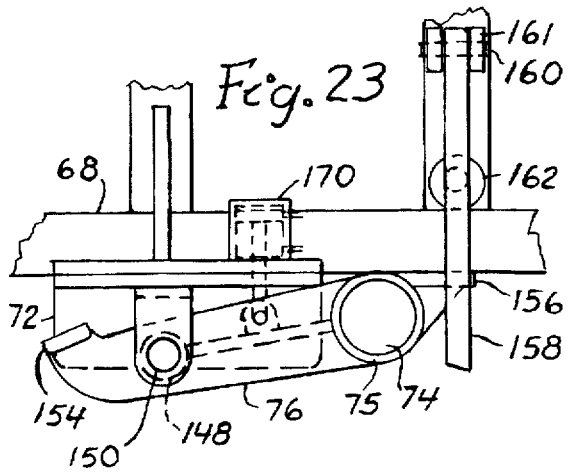
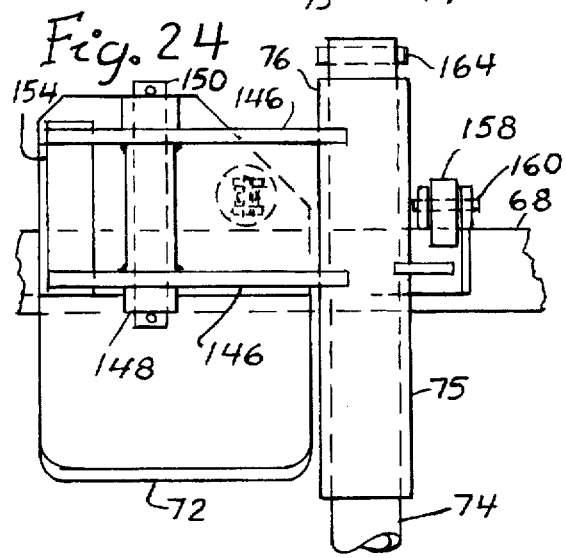
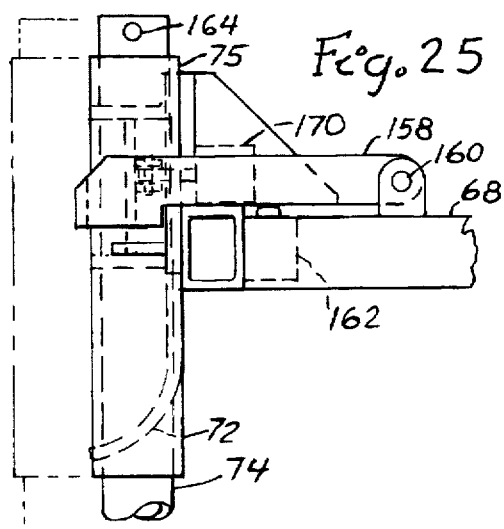

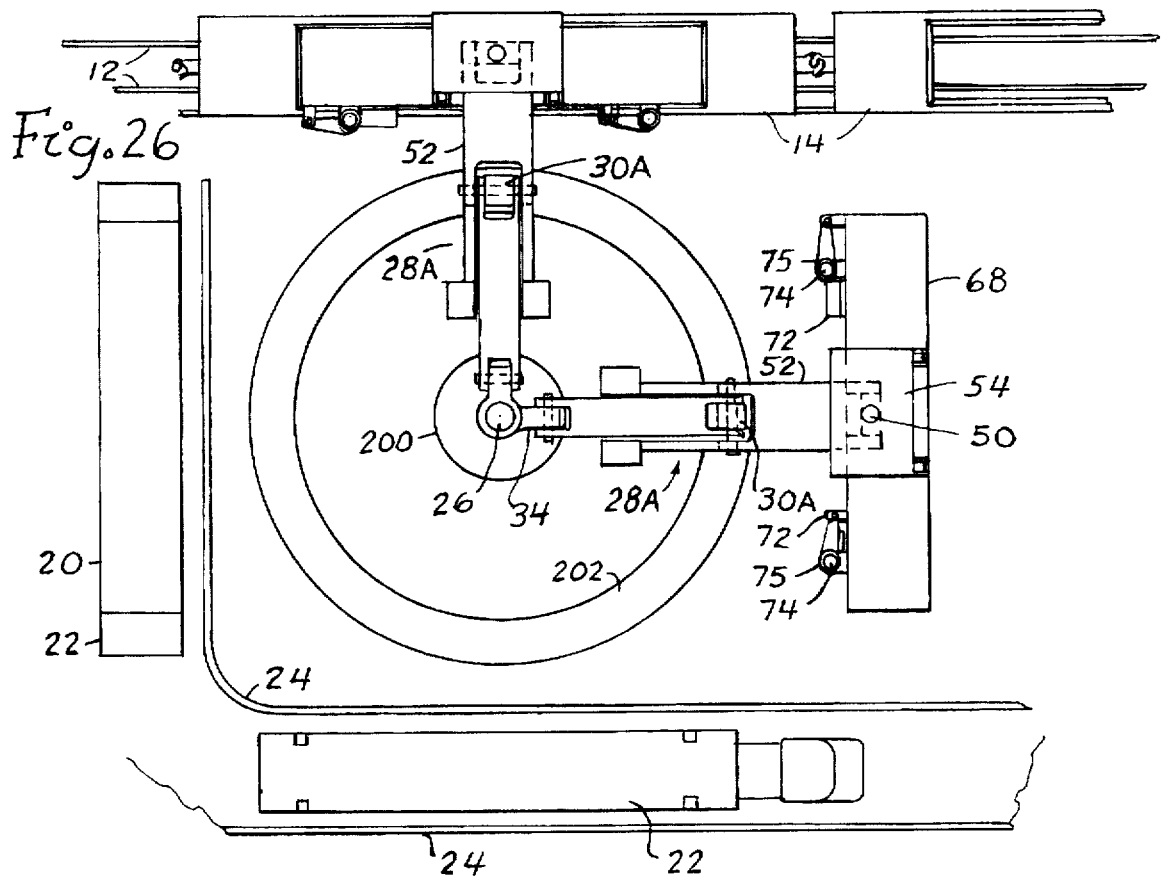
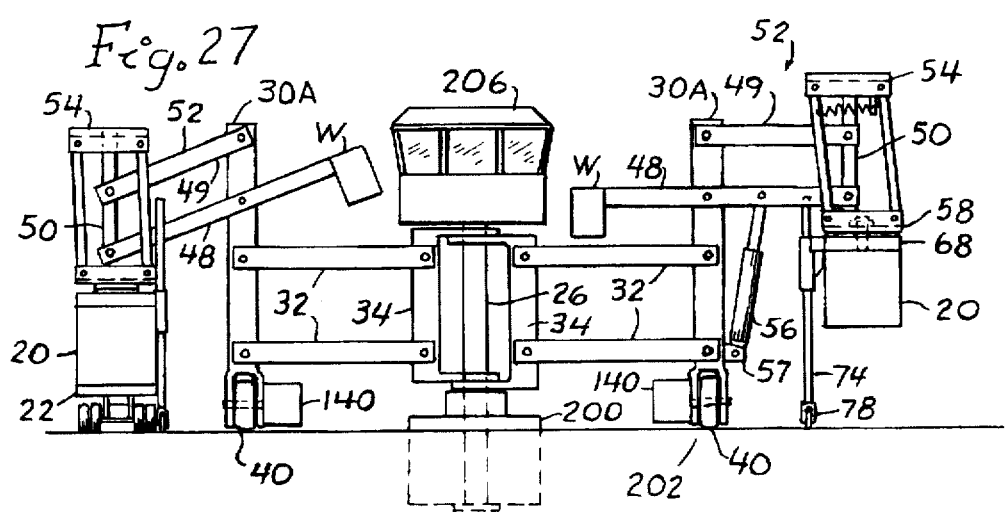

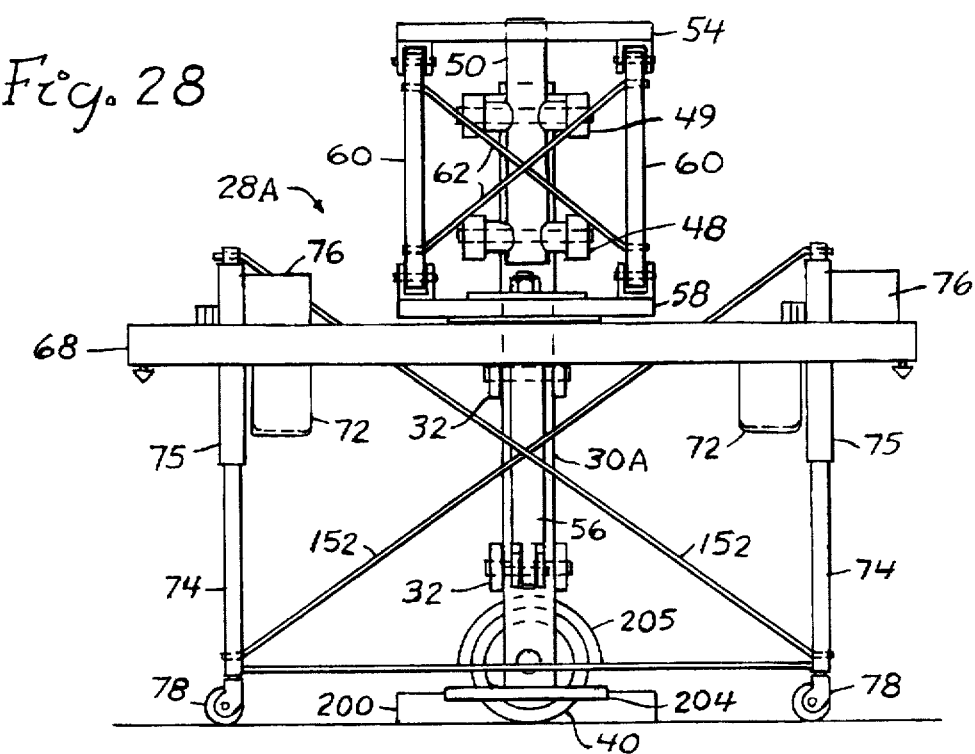
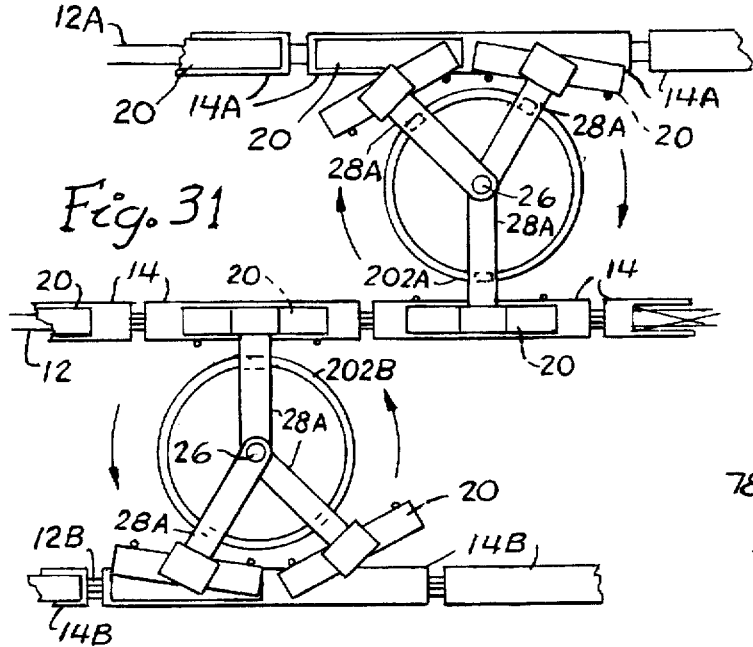
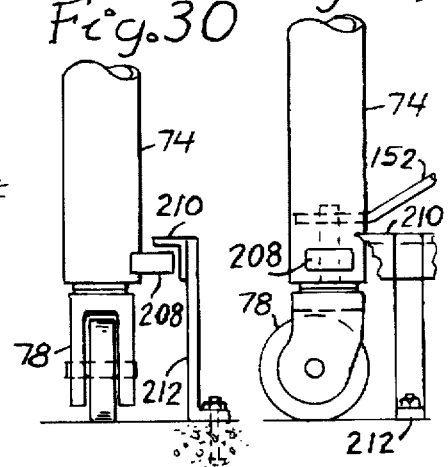
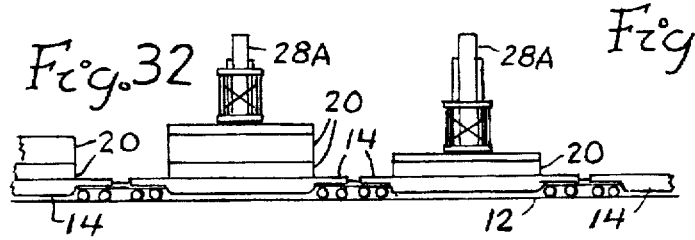
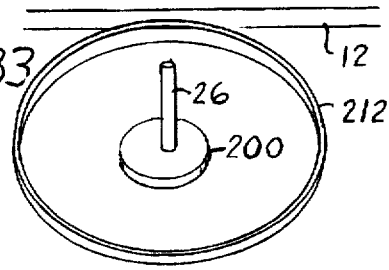

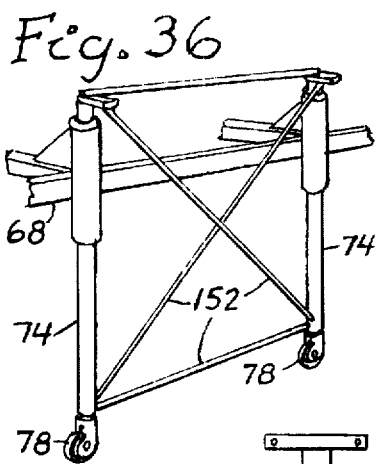
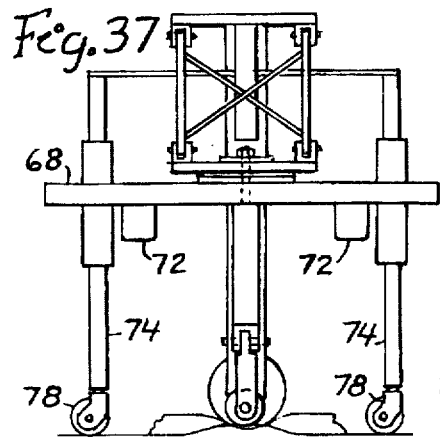
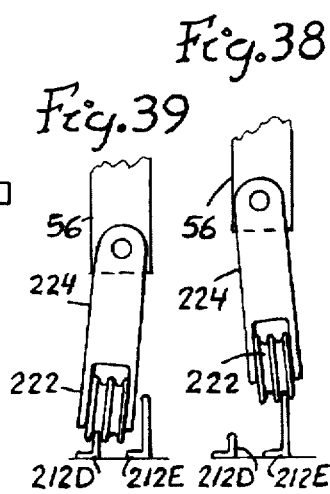
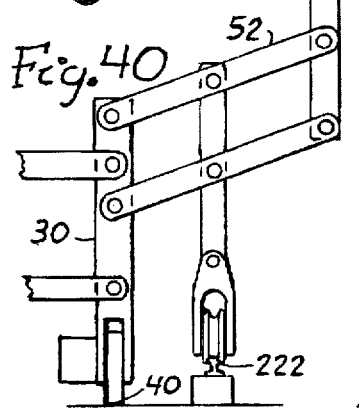
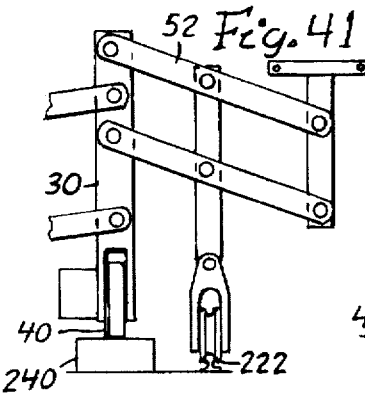
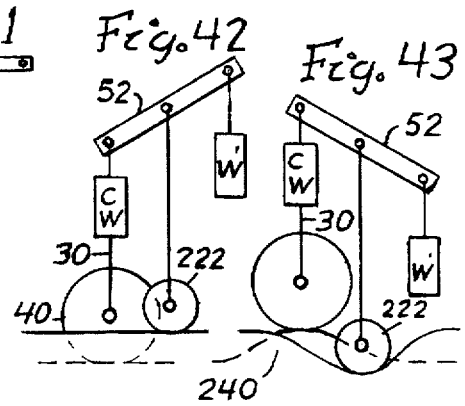
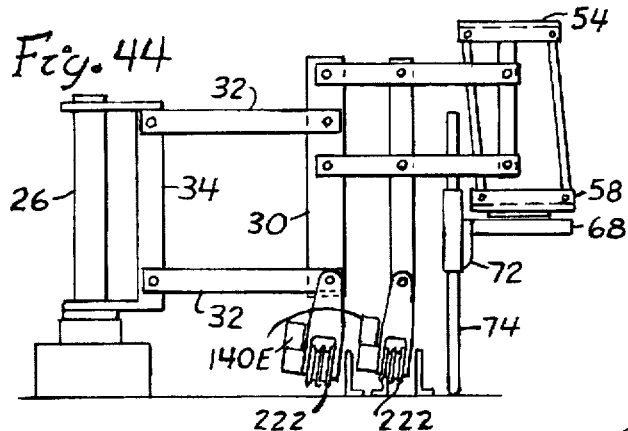
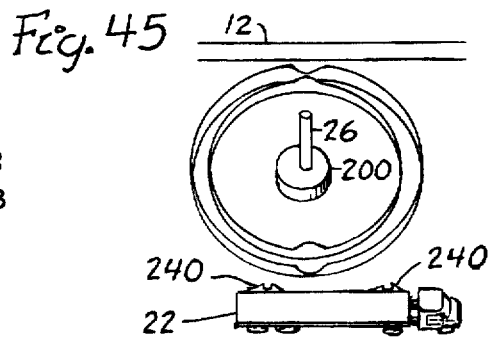
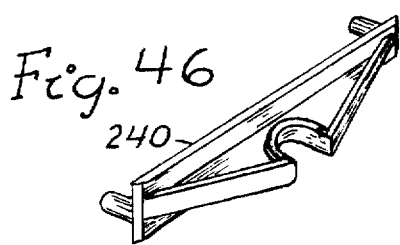
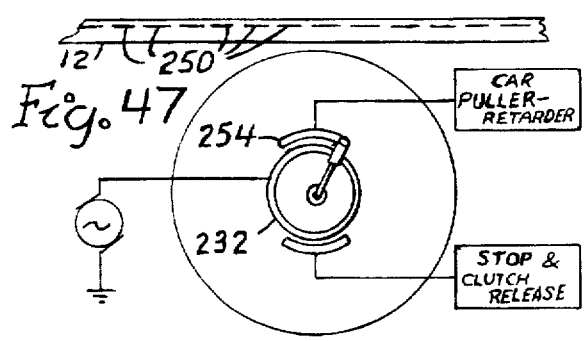

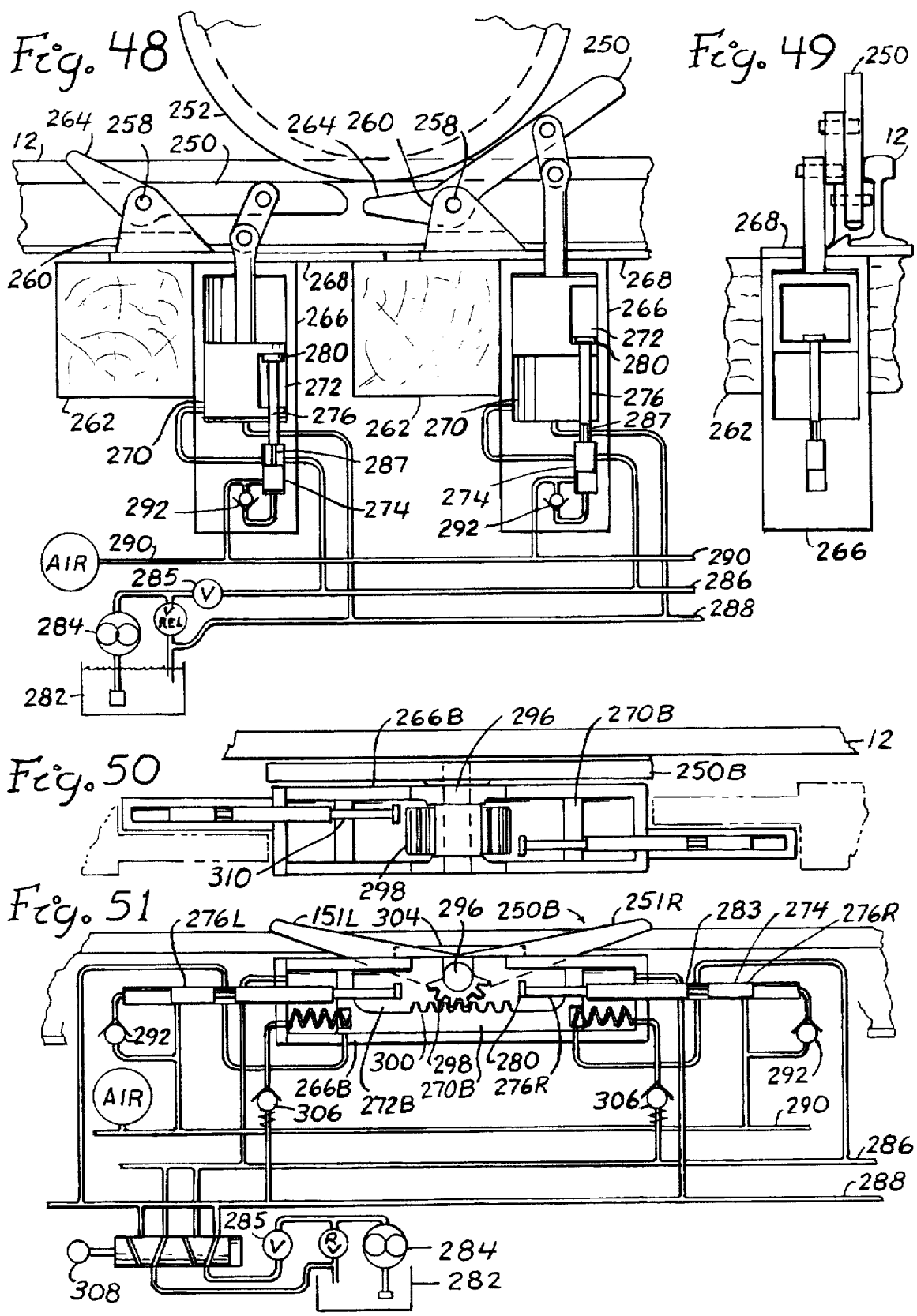

ROTARY LOADER AND SYSTEM

CROSS REFERENCE TO RELATED PATENTS

This invention is an improvement over my U.S. Pat. No. 5,219,261, issued Jun. 15, 1993 and to lesser extent to other of my patents on rotary loaders.

It is desired to provide an improved rotary loader for cargo containers which can load and unload double stacked railway cars as well as single level cars and trailers and further set and lift containers on the ground to carry the load on the ground instead of on the pivot column or its supporting vehicle.

It is an object to reduce the cost of the loader and installation by simplifying the design, reducing the size for a given capacity, counterbalancing the weight of the loader, and balancing the lifting and lowering forces of the cam dip.

It is an object to provide a vertical mast close to the loadspreader and supported on one or more wheels to revolve around a pivot post to carry the load on a track on the ground to reduce the reach of the loader beyond to reduce the weight needed to counterbalance the crane portion of the loader. It is an object to hold the mast vertical by parallelogram linkage to the pivot post.

An object is to reduce the load on the cam rider and its track so the cam rider can lift more easily on the cam track slopes to reduce the twisting forces between the vehicle, loadspreader, and the parallelogram arms.

It is further object to provide lifting ramps for the mast wheels corresponding with dips in the cam track so the lifting force on the mast is counteracted by the lowering of the cam wheel and vice versa as the cam wheel lifts the load from a cam track dip. It is an object to reduce thereby the size of the dip and its slopes. It is an object to magnify the smaller dip in the cam track by the lift of the mast. It is an object to reduce the height and length of the cam track dip to set in and take out a container in the well of the double stack container car.

It is an object to reduce the forces between the loader and a vehicle moving the loader. It is an object to reduce the distortion of the loader under these forces. It is an object to keep the loadspreader more level under these forces. It is a further object to better carry these forces between the moving vehicle or train and the loader moving with the train by improving the side coupling.

On my prior patent the cam wheels support the full weight of the crane and its load. This present improvement provides a mast to carry the weight of the crane, any counterweight for it and lift means for vertically operating the crane, which if counterbalanced only needs to provide lifting force for the load. A hydraulic cylinder is connected between the crane and the mast, or a cam wheel and linkage is provided to lift and lower the crane.

It is an object to provide for transfer of containers on each level on the cars at successive stations on opposite sides of the track from single stack container cars on opposite outside tracks to further speed transfer.

It is an object to provide degrees of automation.

it is an object to eliminate need for side coupling pockets or hooks on the vehicles where possible.

It is an object to provide correct transverse alignment of the loadspreader over the vehicles of different width.

It is an object to apply the loader to a gantry crane to travel over a container storage area.

It is an object to provide car movers to index the cars or reduce side coupling forces.

These other and further objects and features should become evident to those skilled in the art by study of this specification with reference to the drawings wherein:

FIG. 1 is a plan view of a transfer yard with a traveling gantry mounted rotary loader for transferring cargo containers between rail cars, storage and semitrailers.

FIG. 2 is a side elevation of the loader of FIG. 1 engaging a container on the ground.

FIG. 3 is side elevation of the loader of FIG. 1 with a container after rolling 90° counterclockwise about the pivot post and coupled to move the gantry.

FIG. 4 is a front view of the loader of FIG. 3 with gantry omitted.

FIG. 5 is a perspective view of the loadspreader and its suspending linkage.

FIG. 6 is a perspective view of the loader to gantry coupling tie on the side of the drive unit extended and engaging in a slot on the gantry.

FIG. 7 is an end elevation of the yard of FIG. 1 with the loader engaging a cargo container in the well of a car.

FIGS. 8, 9 and 10 are respectively partial sectional plan, side, and front views of the cab and drive and mast support for the loader to a larger scale.

FIG. 11 is a schematic of the drive.

FIGS. 12, 13, and 14 are respectively plan, side and front views of the frame for the drive.

FIG. 15 is a front elevation view of the mast.

FIG. 16 is a sectional view of the mast taken on line 16—16 of FIG. 13.

FIG. 17 is a bottom view of the mast with steering chain added.

FIG. 18 is a sectional view of the mast and pin control to limit steering taken on line 18—18 of FIG. 13.

FIGS. 19, 20, and 21 are end elevations of the loadspreader engaging respectively a well car, a semitrailer, and a container on the ground with a second container and loadspreader position shown in phantom for engaging a container on top of the one on the ground.

FIGS. 22 and 23 are plan views of an alignment or coupling column hinge mount on the loadspreader in respectively extended and retracted positions.

FIGS. 24 and 25 are respectively front and side views of the coupling column hinge mount and locating horn mounted on the loadspreader.

FIGS. 26 and 27 are respectively plan and side views of a container transfer yard with two loaders mounted to run around a ground mounted vertical pivot post transferring containers between well cars and semitrailer.

FIG. 28 is a front elevation of a loader of FIGS. 26 and 27 to larger scale.

FIGS. 29 and 30 are respectively back and end elevation views of the bottom end of an alignment column and the hold down track therefore to a larger scale.

FIGS. 31 and 32 are plan and side elevation views of a transfer yard for stacking cargo containers on railway cars using separate rotary loaders for each level.

FIG. 33 is a perspective view of a transfer ring with cam track without transfer dips.

Figure 34:
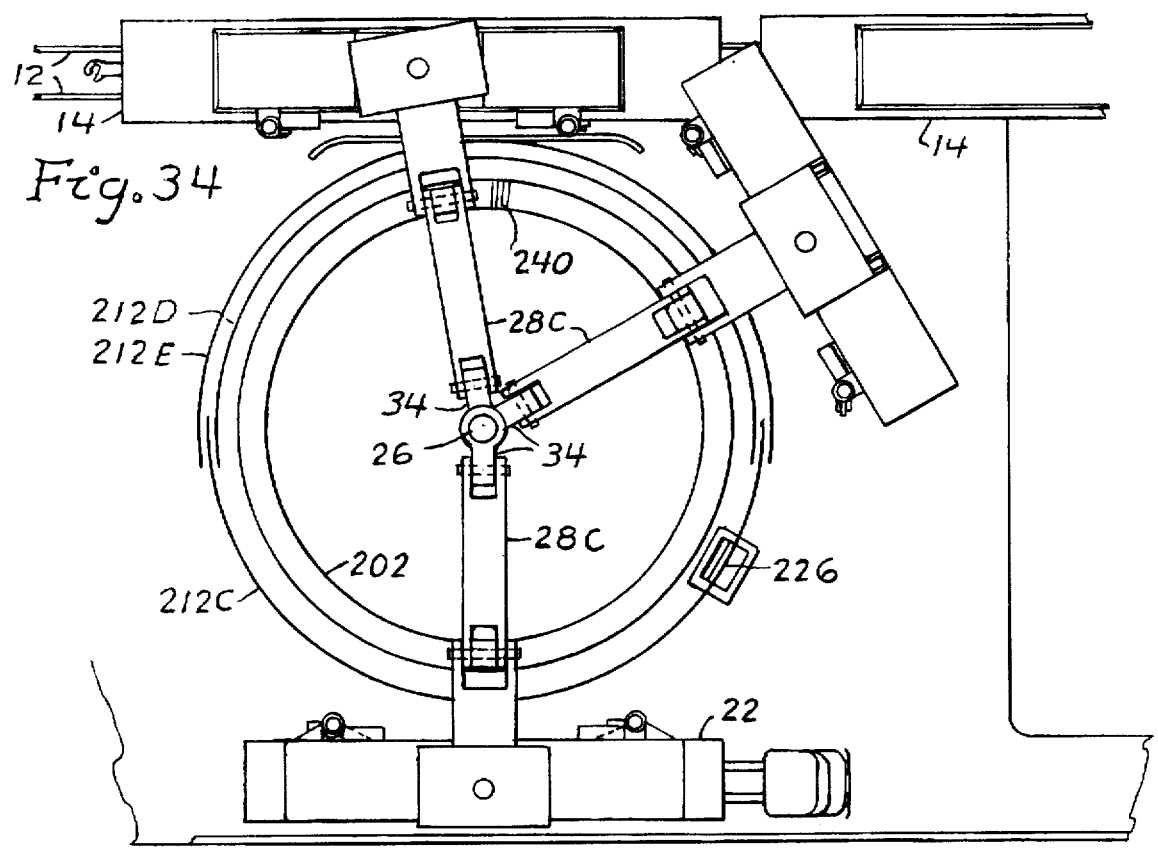

FIG. 34 is a plan view of a cam controlled transfer yard with three loaders transferring containers between track and rail cars with a cam track for each level.

Figure 35:
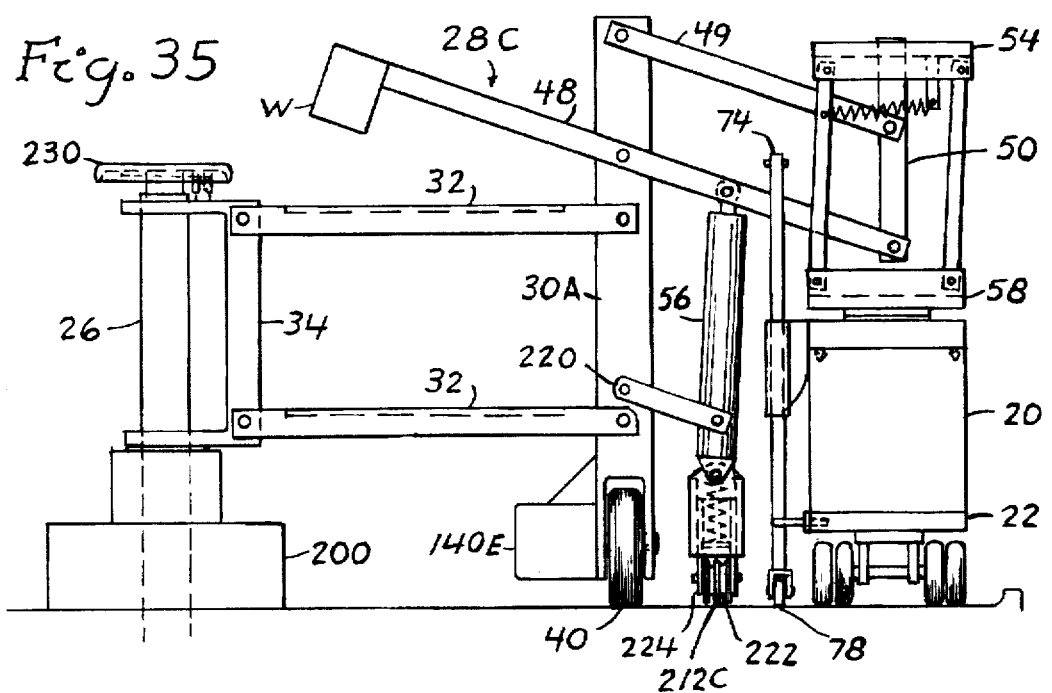

FIG. 35 is a side elevation to larger scale of a loader in FIG. 34 transferring a container on a trailer.

FIG. 36 is a perspective view of the coupling columns and cross bracing on the rear of a loadspreader.

FIG. 37 is a front view of a loader of FIG. 34 on a cam transfer dip.

FIGS. 38 and 39 are end elevations of a cam wheel lift on different rails of the can tracks.

FIGS. 40 and 41 are side elevations of a portion of a loader raised and lowered by cam track dips.

FIGS. 42 and 43 are schematic views showing how the mast is lifted and the boom lowered by the cam track to balance out the slopes.

FIG. 44 is a side elevation of a loader where the mast is also supported on a cam track.

FIG. 45 is an oblique plan view of a double cam track and yard for the loader of FIG. 44.

FIG. 46 is a perspective view of a side coupler for inserting in holes in the trailer bed.

FIG. 47 is a schematic plan of the transfer yard with car puller and retarder control.

FIGS. 48 and 49 are respectively sectional side and end views of single directional car movers with a schematic of the controls shown in FIG. 48.

FIGS. 50 and 51 are respectively sectional plan and side views of two-way car movers with schematic of controls shown in FIG. 51.

Referring to the drawings and in particular to FIGS. 1–4 and 7 where 10 is a container transfer yard with railway track 12 with cargo container well cars 14 thereon. A traveling gantry 16 rolls on rails 18 spaced parallel along one side of track 12 and spanning a storage area for cargo containers 20. Semitrailer 22 is positioned to be loaded with a container along curb 24.

The gantry supports a central vertical pivot post 26 extending up above its frame about which a rotary loader 28 runs supported vertical to turn on the post full circle around the gantry. The loader has a mast 30 pivotally connected by substantially horizontal parallel arms 32 to an offset bracket 34 forming a parallelogram linkage to support the mast vertically. The offset bracket is mounted to revolve on post 26 leaving room for additional loaders to be mounted on the post.

Arms 32 are wide channels turned legs down or built up structure to resist twisting forces the mast will have. The mast is pivotally supported on a drive unit 36 including an operator's cab 38 and two drive wheels 40 one on each end of a differential axle housing 42 whose axis is through the centerline of the mast. The mast pivotally carries parallel arms 48 and 49 extending in plane of arms 32 out to a load support column 50, forming therewith a parallelogram linkage crane 52. A rectangular platform frame 54 is secured level central on top of column 50 and is lifted by one or more hydraulic cylinders 56 pivotally connected rod end to arm 48 and head end to bracket 57 on the forward side of mast 30 above the cab. Platform frame 54 suspends a corresponding lower frame 58 on two swinging links 60 at each end to form a parallelogram linkage on each end. The parallelograms on each end are tied together parallel with cross bracing 62 to form a parallelopiped linkage 64 so as to substantially prevent endward sway and tilt. Frame 58 has a central swivel thrust bearing 66 supporting a loadspreader 68 so as to turn freely and substantially level and stable. Arm 48 is extended back from mast 30 with counterweights W added to counterbalance the crane with loadspreader.

The loadspreader has the usual corner twist locks 71 for engaging the standard corner castings on the containers, alignment horns 72, and improved vertical alignment columns 74 on which slide sleeves 75 mounted on hinges 76 to the loadspreader. A swivel caster 78 supports each column 74. A guard rail 77 runs along the edge of track 12 pavement of yard 10 to keep columns 74 from engaging with track 12 if there is no car or between cars.

The loadspreader is turned freely by engaging the alignment columns 74 against a vehicle or cargo container. A spring rod 82, FIG. 5, runs through eyes 84 in the lower frame 58 and in the loadspreader to align the loadspreader at right angles to the plane of arms 32, 48 and 49 when freed of turning forces. Preferably a spring cylinder of spring 85 is connected between a rear link 60 and top frame 54 to extend the loadspreader out for greater reach to engage a vehicle along a longer chord of alignment for transfer.

Referring to FIG. 6, the drive unit has two side coupling channels 86 one on each side hing mounted legs in-up to each side of the drive unit above wheels 40 and operator controlled by cylinder 88 to lift and lower to extend down to engage the channel in a pocket 90 central at each end of the gantry to move the gantry with the drive unit when at either end of the gantry and when the drive is facing in either direction to move the gentry. Cylinder 88 lifts channel 86 as a draw bridge to disconnect this side coupling to the gantry.

Referring to FIGS. 8–18 for details of the drive unit, the mast is mounted slip-fit in sleeve 92 secured vertical on top of the drive unit to turn on the bottom of the mast. Drive wheels 40 are connected on axles extending from differential axle housing 42 so they can be turned in opposite directions for steering—turning the drive unit around on the mast. The differential axle housing has the usual gearing and is spring pocket mounted in yoke 96. Sleeve 92 is bolted through holes in the frame of the drive unit into the yoke. Yoke 96 has a central shallow depression 98 on top with a thrust bearing therein to support the mast to be turned with steering wheel 100 in cab 38 secured at the front on top of drive 36. Sleeve 92 extends above the cab and has a stop block 102 secured extending above the sleeve to be engaged by turn limit blocks 104 on the mast, FIGS. 13, 15 and 16, to limit turning of the drive unit to forward (outward facing) from reverse sides of the gantry −180° of travel. A sprocket 106 is secured concentric on the bottom of the mast and slips down through sleeve 92 at assembly. Steering wheel 100 is connected by shaft 107 through tube 108 through the floor of the cab to sprocket 110. A chain 112 connects sprockets 106 end 110 to turn the drive unit 180° about the mast. A pin 114, FIG. 18, locks the mast and sleeve together and therefore the drive unit to mast 30 in positions with wheels 40 parallel to arms 32 bridge to run around pivot post 26 in either direction cab first without steering. Pin 114 is inserted in hole 116 or slots 118 by spring 120 and is released by linkage 122 to foot lever peddle 124 so the steering wheel can be turned to oppositely rotate drive wheels 40 to turn the cab and drive around 90° in either direction from forward position shown in FIG. 18. Wheels 40 should not be driven when the cab is being turned around. The cab is turned parallel with crane rails 18 when 90° from either end of travel, and pin 114 is released to engage a slot 118 limiting steering to about 10° each side of parallel to the rails so the drive unit can tow the gantry along its track.

Referring to FIG. 11, the drive unit includes an engine 128, hydraulic pump 130 connected thereto taking oil from tank 132 through throttle valve 134, reversing valve 136, drive motor 140 to tank driving reduction gearing to the beveled gear input to the differential gear assembly 42 controlled in a usual manner by the operator.

Referring to FIGS. 19–21, locating alignment columns 74 should engage either side of the 10' wide well cars and the 8' wide semitrailers and align the loadspreader transversely centered over each vehicle. Therefore the alignment columns are adjusted in and out about one foot. The two alignment columns on each loadspreader are each mounted on hinges 76 on a plate bracket mounted on top of the loadspreader as shown in FIGS. 22–25 and spaced apart on the back side, side facing operator, to engage the side of a vehicle or container to turn the loadspreader into alignment with the vehicle or container. The alignment column is slip mounted in sleeve 75 on hinge 76 connected by arms 146 or plates to a hinge sleeve 148 through which hinge pin 150 is bracket mounted to stand off from the rear edge of the loadspreader about half the distance of travel (six inches). Both hinges 76 on the loadspreader are the same—not right and left hand—so the distance between the coupling rods remains the same when moved together out or in so the coupling rods can be tied by cross bracing 152, FIG. 28, if desired for strengthening. The hinges each have a back stop extension 154, which limits the distance the column can be away from the loadspreader and a tongue 156 which is blocked out or in by stop latch 158. Latch 158 is pivotally mounted on pin 160 by bracket 161 to the loadspreader to be lifted by a ram cylinder 162 engaging the bottom of the latch. Latch 158 can drop between tongue 156 and the loadspreader to block the alignment column out, FIG. 22, for engaging a well car, or drop behind the tongue to block the tongue against the loadspreader, FIGS. 23 and 25, for engaging a trailer or container in storage. A pin 164 through the top of the alignment column prevents it from slipping out of the sleeve if the loadspreader is lifted above its normal limits. Depending alignment horns 72 are secured inward of the alignment columns so the ends of the loadspreader beyond the columns clear over containers to be engaged. Hinge 76 is moved in or out by an air or hydraulic cylinder 170 when the latch is lifted.

OPERATION FIG. 1

With the loader positioned as in FIG. 1, the drive unit can be facing the container on the ground as shown in FIG. 2 or it could have approached the container at the proper distance while transversing an arc about the gantry. In either case the operator releases pressure in cylinder 56 to lower the loadspreader aligned to engage the twist locks in the corner castings and preferably pulls out pin 114 and turns the steering wheel 100 to rotate the drive unit 90° to be parallel to the gantry before lifting the container to travel clockwise or counter clockwise to set the container respectively on the trailer or well car. The container should be lifted to clear over the adjacent double stacked containers on the ground or before the drive unit is turned the loader is backed away about six feet to clear the containers on the ground to the right. The operator stops the drive when aligned lengthwise with the vehicle to be loaded. If the railway car is the vehicle the operator lifts stops 158 and pressures cylinders 170 to extend and latch the alignment columns out (one foot approximately). The locating columns have aligned the loadspreader transversely. The operator lowers the loadspreader to place the container on the vehicle, turns the twist locks with the usual means, lifts off the loadspreader, reverses the drive and rotates backward 90° about pivot post 26 to bring the crane parallel with the gantry track as in FIG. 1, pulls out stop pin 120, turns wheel 100 to turn wheels 40 oppositely to turn the drive unit 90° on the mast to position shown in FIG. 2, releases stop pin 120 to enter hole 116, and drives forward with the loadspreader at a height to clear and align the top container stacked to the right to engage and move that container similarly.

When latches 158 are holding hinges 76 against the back of the loadspreader for aligning a container on a semitrailer the loadspreader can also align a container on the ground. When latches 158 are holding hinges 76 out for aligning a well car the loadspreader can also align a container on the ground without resetting hinges 76, since deflecting horns 72 push the loadspreader back the one foot to align over the container. The loadspreader can align a container on the ground with hinges 76 out or in.

VARIATIONS

Like parts are given the same reference number or a suffix added to distinguish a substantial variation.

Referring to FIGS. 26–28 where the pivot post 26 is embeded in a concrete base 200 on the ground with a paved ring 202 concentric around for loaders 28A to run around the post. The mast 30A is mounted on a drive wheel 40 powered by motor 140 to revolve around the post, and braced thereto by parallel linkage arms 32 and offset bracket 34 forming the parallelogram linkage to support the mast vertically. The offset bracket 34 enables loaders to be mounted on the post close enough for successive loaders to follow each other at the same distance or pitch as successive cars. Two loaders are shown in FIGS. 26 and 27, but another could be added. With the pivot post fixed in location, the cars 14 and trailers 22 would be moved to the loader.

The crane 52 and loadspreader 68 are as described. Drive wheel 40 has a guard or bumper 204 and fender 205, FIG. 28. A container trailer bed 22 can be parked as shown both either parallel or at right angles to the tracks for container transfer, FIG. 26. A control house 206, FIG. 27, is added on top of post 26. FIG. 28 shows how the alignment columns are cross braced 152 top to bottom and bottom to bottom to better carry longitudinal forces especially if the vehicles are side coupled with the loadspreader.

Referring to FIGS. 29 and 30, if the alignment columns 74 tend to stick in sleeves 75 when the loadspreader is lifted they can be held down by tabs 208 secured facing back from the track along where transfers are made and held down by rail 210 supported on brackets 212 along the transfer run along track 12 and positioned for the tabs to follow under and engage if lifted slightly to keep the columns from being lifted out of engagement with the vehicles after transfer.

Referring to FIGS. 31 and 32 for the preferred yard arrangement for large volume double-stacked container train loading-unloading, where well cars 14 on the center track 12 are being loaded by loaders 28A on a first loading ring 202A taking containers from single level cars 14A on track 12A preloaded with containers for the wells and then passed to the left for loaders 28A on a second ring 202B on the opposite side of track 12 to load the top level containers taken from cars 14B on track 12B preloaded with containers for the top level. Cars 14A and 14B can be loaded dock side from ships, storage, etc. and brought to this staging area where more space is available for loading the double-stack trains and visa versa in reverse for unloading. Loader rings 202A and 202B are preferably spaced one car length apart along track 12 on opposite sides of the track so tracks 12A and 12B do not crossover in the yard and so a loader on each ring loads successive cars simultaneously as shown for each movement or indexing of the cars 14 after the first to load two containers or unload two when operated in the reverse direction.

There are different degrees of automation the addition of cam tracks can provide. The first transfer ring 202A of FIG. 31 could have a cam track 212, FIG. 33, to provide the elevation for the loaders to bring containers over cars at the right height for loading or unloading the well. The second transfer ring 202B a car length or more away and across the track therefrom could have a similar cam track 212 to bring the containers to the correct height over cars for loading and unloading the second tier of containers thereon. This cam track saves the operator from lifting the loadspreader to the proper height for moving about the pivot post—at present a big job subject to operator's error. The transfer dip can be provided by hydraulic cylinder 56 being lowered and raised an equal amount for transfer or by a dip in the cam track or by both a dip in the cam track and a hump over which the mast runs so the mast is lifted at the cam track dip and counteracts the forces needed to climb out of the dip because the mast is then running down its hump. The hump can greatly reduce the size, slope and length of the dip needed for a given vertical movement of the loadspreader thereby reducing the distance of travel the car would need to be aligned vertically with the loadspreader for transfer.

If this loader transfers between trailers and railcars which have no side coupling for the loadspreader it must have no cam track transfer dips and the cars must be moved for each transfer to approximately align them centered on a line at right angles from the pivot post to the track the car is on, and stopped and held there until the loader is aligned and makes vertical transfer. The loader can align its loadspreader over 20 feet from this center line for transfer for a distance of about 40 feet—the transfer run. This alignment run subtends approximately 30° each side of the center line, enough for stop-start positioning of each car for the loading-unloading to be practical. Though possible to spot each car within the available alignment distance, much quicker transfer can be achieved by keeping the cars moving by providing side coupling pockets and cam track dips to lower and raise the loadspreader for transfer. With cam track transfer dips the cars and trailers would be longitudinally coupled to the loadspreaders.

The operators of both rings of loaders, FIGS. 31–32, should coordinate loading of the cars i.e. signal or control the car mover to move them only when both are ready to be indexed one car length. Optionally the cars can be kept moving slowly subject to being stopped by the operator of either ring.

Referring to FIGS. 34–35 where three loaders 28C run on cam tracks 212C and 212D or 212E about pivot post 26 to transfer containers between semitrailers 22 and two levels on rail cars 14, each of the one or more loaders 28C can lead or unload both the well and the second level of the cars 14. Each of the three loaders shown can be as described with FIGS. 26 and 27 except the head end of cylinder 56 is pivotally connected by link 220 to the mast and to a two-grooved cam wheel 222 in a lifting link 224, FIGS. 38 and 39, pivotally mounted to shift the cam wheel substantially axially for riding on selective cam track rails around the pivot post.

The cam track, FIG. 34, is in three concentric semicircular arcs center rail 212C and outside rails 212D and 212E. Middle rail 212C runs past the track or single level transfer run at a height for transfer with or without a dip for transfer. Rails 212D and 212E respectively carry the loadspreader at a height for transferring containers to the well and to the second level, each with or without a transfer dip. Rail 212C ends adjacent between rails 212D and 212E and preferably extends between them a short ways at each end of the rails spaced apart so the cam wheels running on the center rail 212C take either rail 212D or 212E as the loader is rotated according to which groove is on rail 212C, so one loader runs cam track 212D to put a container in the well and the next runs cam track 212E to put a container on top of that container without dips in the cam track rails. This is done with operator control of cylinder 56 for transfer during alignment with the cars stationary. After each car is loaded on both levels by successive loaders about one pivot post the cars are indexed to the next car for double stack loading or in reverse for unloading.

A tongue switch 226 in rail 212C can be used to shift the grooved wheel 222 for either groove to run on rail 212C so one or an odd number of loaders can be operated this way round the pivot post or and even number of loaders can be used with alternate ones running alternate rails 212D or 212E, and no moving switch is needed.

Coupling columns 74 are cross braced with rods 152 as shown in FIG. 36 for maximum strength where vehicles are to be coupled to the loadspreader especially when the loader is moved by the vehicle as the loader would be unclutched so the tractor-trailer could drive away and move the loader out from over the trailer.

A circular cap 230, FIGS. 35 and 47, is secured central on top of post 26 extending out to support and shield insulators holding concentric ring 232 end segment conductors positioned and engaged by underrunning electrical contacts on the offset bracket 34 to connect power to motor 140E and its electric brake and clutch according to the loaders position around the pivot post.

Referring to FIGS. 37 and 40–43, cam track dips are added and a lifting ramp or hump 240 is added to lift the mast wheel 40 wherever the cm wheel 222 is dipped. This counterbalances the lifting force of the ramps lift with the dip of the cam wheel, and counterbalances to lowering of the mast when its wheel runs down the hump with force needed to move the cam wheel up out of the dip. This is seen in compairing FIGS. 40 and 41. FIG. 40 shows wheels 40 and 222 at levels to carry the loadspreader over a vehicle for transfer, and FIG. 41 shows the mast wheel on top of hump 240 and the cam wheel on the corresponding dip to lower the loadspreader for transfer. This is further illustrated by FIGS. 42 and 43 corresponding respectively to FIGS. 40 and 41 where the weight CW on the mast is counterbalanced by the weight of the load w'.

Referring to FIG. 44 where the mast 30 is also supported on a cam track wheel 222, each cam wheel 222 is driven by a motor 140E. FIG. 45 shows a double cam track for this loader for single level, well, or top level transfer for the double ring yard of FIGS. 31–32. For two levels of transfer around one pivot post two concentric sets of cam tracks as in FIG. 34 can be provided one for each cam wheel as in FIG. 44.

A preferred way to operate the loaders for double stacking is to keep the cars moving slowly and load all the wells with a plurality of loaders operating about one pivot post using a track as in FIG. 34 with cam track dips and mast humps and after reverse the movement of the cars past the loaders and load containers on the top levels of the cars.

Referring to FIGS. 45 and 46, side couplers 240 are plugged into holes in the side of the trailer bed as in FIGS. 23 and 24 of my U.S. Pat. No. 5,219,261 except the present couplers 240 set the locating columns out from the trailer bed so sleeves 75 for columns 74 need not be moved back on hinges 76 but can be spaced fixed in position back from the loadspreader for engaging the well car.

CAR MOVER

Referring to FIGS. 47–49, the cars are preferably moved along track 12 by a series of trackway car movers, levers 250, which operate successively against the flange of car wheels 252 to move them to the left under control of the loaders position in the arc about the pivot post 26 to release track brakes and move the cars while the loader is within the arc 254 FIG. 7 wherein it would be side coupled to the vehicle. Side couplers or pockets are provided on the cars as in my U.S. Pat. No. 5,219,261 to engage the alignment columns to align the loader lengthwise the car, or else the car movers would be operator controlled.

Each lever 250 is pivotly mounted on a pin fulcrum 258 in a bracket 260 mounted to a tie 262, FIG. 48, and has a forward detecting arm 264 turned up to be depressed by the flange of a car wheel. The prying end is lifted by a hydraulic cylinder 266 secured vertical on yoke or plate 268 between cross ties of the track. The cylinder has a long piston 270 with a pocket 272 between its ends. A spool valve 274 has its operating stem 276 extending through a hole in the head end of the piston into the pocket and into a chamber in the head end of the cylinder. A lifting knob 280 on top of stem 276 is lifted by the bottom of pocket 272 when the piston is fully lifted. Fluid is connected from tank 282, pump 284, through valve 285 to line 286 to each car mover, where connection is made through neck 287 in spool valve 274 normally open to a port in the side of cylinder 266 to be opened to let in fluid when the piston is slightly lifted to force the piston up to top position where the spool is lifted by knob 280, closing off pressure at the spool valve, and opening an exhaust port through neck 287 of valve 274 to line 288 to tank 282 to let the cylinder drop by gravity restoring the lever to normal position as seen at the left. Spool 274 is held lifted by air from line 290 until the fluid drains from cylinder 266, piston 270 drops and hits the top of knob 280, depressing the spool all the way down forcing air out through a check valve 292 back into line 290 to AIR to wait until the next wheel to push.

TWO-DIRECTIONAL CAR MOVER

For two-directional movement of cars, car movers as shown in FIGS. 50 and 51 are preferred. This car mover 250B has right and left pry arms 251R and 251L connected at about a 20° angle and secured to a fulcrum shaft 296 at right angles supported through center of cylinder 266B to work back and forth to let a wheel roll by. A gear segment 298 fixed on shaft 296 engages a gear rack 300 in a pocket 272B between the ends of a floating spring centered piston 270B in the double-head-end cylinder 266B—no piston rod—. Shaft 296 is mounted in slots in cylinder 266B, which has a top central open area covered by cover 304, which has depending bearing retainers which hold the shaft to turn.

The right hand end of cylinder 266B is similar to and connected as cylinder 266 is except a head-end exhaust connection through a check valve 306 to line 286 is added. The left hand end of cylinder 266B is the same as end connected the same as the right hand end except reversely to lines 286 and 288. Lines 286 and 288 are reversely connected to pressure or exhaust through reversing valve 308 positioned by the operator according to the direction selected for moving the cars. Valve spools 276R an 276L extend into the gear rack chamber end are offset from center as seen from plan view FIG. 50 so successive car movers can overlap to be closely spaced along the track. Each spool has a step 310 and an extended air chamber for the piston to move the spool on the unpressured side of the cylinder so the piston can have full travel in each direction to move the wheel.

After valve 308 is set as shown for moving cars to the left, valve 285 is opened, connecting pressure to line 288, so where a wheel pressing a lever 251L down has moved a piston 270 a little to the right, fluid is connected from line 288 through the neck of spool 276L to the left end of that cylinder 266B just behind the piston, driving the piston to the right, exhausting the right side of the cylinder through check valve 306 to line 286, raising arm 251R to push against the flange of the wheel to drive it to the left until the stem of valve 276L at the left is pulled in by the piston engaging its knob, cutting off pressure from line 288 at its spool and opening exhaust through the neck of the spool to line 286 to tank 282. Line 286 is connected to pressure and line 288 to exhaust to similarly move the wheels to the right. Air is connected similarly as for cylinder 266 from line 290 to the outer ends of spool chambers for spools 276R and 276L.

There can be more than one mast and wheels supporting the mast spaced at different angles from the pivot post to increase stability and reduce twisting. There are many possible variations which are within the spirit and scope of this invention, I therefore do not wish to be limited to the embodiments disclosed but desire full coverage of this invention with the appended claims.

I claim as my invention:

1. A rolling mast rotary loader for transfer of cargo containers between railway cars and semitrailers comprising, a vertical pivot post, a mast, substantially horizontal parallel arms pivotally linking said mast to said post vertically forming a parallelogram linkage for supporting said mast vertically, motorized wheel means supporting said mast to roll in an arc of a circle around said post, a crane comprising parallel arms pivotally secured one above the other to said mast and a vertical load support member forming therewith a second parallelogram linkage mounted on said mast having arms extending in a plane parallel to the first said parallelogram linkage out further from said mast, a top frame supported on said load support, member a bottom frame, parallel links connecting said top and bottom frame on each side forming a parallelopiped linkage supported by said vertical load support member and free to swing said bottom frame out and back substantially parallel to said arms, a loadspreader pivotally supported to rotate horizontally on said bottom frame of said parallelopiped linkage, means for lifting and lowering the crane's arms to lift and lower said loadspreader relative to said mast, and means for rotating and moving on said loadspreader on said parallel links to align the loadspreader for transfer over both the railway car and the semitrailer when revolved thereto.

2. A loader as in claim 1, said means for rotating and moving (to align) including, at least two hinges mounted to swing horizontally on said loadspreader, a vertical sleeve on each of said hinges, a vertical alignment column slip mounted in each said sleeve to shift back from said loadspreader, and stop means limiting movement of said hinges to align and hold said columns a distance from said loadspreader for aligning the loadspreader central over the railway car and semitrailer between which said loader transfers cargo containers.

3. A loader as in claim 1, said means for lifting and lowering including at least one hydraulic cylinder.

4. A loader as in claim 1, said means for lifting and lowering including a cam track substantially concentric about said pivot post and a cam rider connected to support said crane for riding on said cam track to elevate the loadspreader to working heights over the vehicles.

5. A loader as in claim 4, said cam track having at least three substantially semi-circular arcs, one for lifting said loadspreader to a height for bringing containers over the railway car for loading-unloading the bottom level of containers on the railway car and a second cam track arc adjacent to the first for lifting said loadspreader to a height for bringing containers over the bottom containers on the railway cars, and third cam track arc for meeting between first and second cam track arcs at their ends to complete the circle to bring containers over vehicles for single level loading, said cam track rider having grooved wheels with plural grooves for static switching between said arcs.

6. A loader as in claim 4, said cam track having at least one cam track dip down and back up for dipping the loadspreader for transfer.

7. A loader as in claim 6, a hump for lifting said mast supporting wheel means corresponding with said cam track dip to reduce the size of the dip and help balance forces of the dip.

8. A loader as in claim 4, a hydraulic cylinder for lifting and lowering said crane, said cam rider supporting a head end of said cylinder on said cam track so either the cam track, the cylinder, or both can lift the loadspreader.

9. A loader as in claim 1, said means for rotating and moving (aligning) including two vertical sleeves spaced apart along the back of said loadspreader, alignment columns slip fit to slide up and down one in each sleeve and means supporting said columns to run around the pivot post to engage said columns against a cargo container or vehicle to rotate the loadspreader to align both for transfer, and means to position the columns to adjust for these vehicles of different widths.

10. A loader as in claim 1 and a railway track, container cars thereon, a gantry track parallel to said railway track, said pivot post being secured on top of a gantry, said wheel means including a differential axle and wheel drive unit centrally swivelly supporting said mast to run around said gantry and transfer containers with said cars, and steering means to oppositely turn said wheels to turn said drive unit at right angles to tow said gantry along said gantry track.

11. A loader as in claim 10 and coupling bridge means between said drive unit and the ends of said gantry to move said gantry with said drive unit parallel at either end of the gantry.

12. A loader as in claim 1, said parallelopiped having therein said load support member centrally supporting said top frame from below central over said bottom frame and loadspreader.

13. A loader as in claim 1, an arm of said crane parallelogram linkage extending back and a counter weight thereon for counter balancing the crane and loadspreader.

14. A rolling mast rotary loader for transfer of loads, comprising:

a pivot post extending vertically from a supporting surface; a mast; arm means pivotally connected to said pivot post and to said mast so as to support said mast in a substantially vertical attitude and allow rotation of said mast about said pivot post; wheel means connected to the lower end of said mast and engaging said supporting surface; means for powering said mast to move in an arc about said pivot post; a crane having one end pivotally supported on the mast; means supported on the crane for engaging a load; and means for powering said crane to raise or lower said opposite end of the crane; whereby, a load may be moved by engaging the load with the crane, powering the crane to lift said load, powering said mast about said post to thereby move said load in an arc about said pivot post, powering said crane to lower said load and releasing said load from said crane.

15. The rolling mast rotary loader of claim 14 in which said arm means comprises parallel linkage arms having first ends pivotally connected to said post and second ends connected to said mast and forming therewith a vertical parallelogram linkage.

16. The rolling mast rotary loader of claim 14 in which said load comprises a cargo container, and said means on the crane for engaging a load comprises a load spreader for engaging said cargo container.

* * * * *